United States Patent [19]
Von Saspe

[11] 3,933,091
[45] Jan. 20, 1976

[54] APPARATUS FOR SCREEN PRINTING BOTTLES

[75] Inventor: Henry Carl Von Saspe, Fort Lauderdale, Fla.

[73] Assignee: New Products Corporation, Staten Island, N.Y.

[22] Filed: June 17, 1974

[21] Appl. No.: 479,988

[52] U.S. Cl. .................. 101/40; 101/123; 101/126
[51] Int. Cl.² ........................................ B41F 17/22
[58] Field of Search............ 101/38 R, 38 A, 39, 40, 101/123, 126

[56] References Cited
UNITED STATES PATENTS

| | | | |
|---|---|---|---|
| 2,132,818 | 10/1938 | Cone | 101/40 X |
| 3,112,692 | 12/1963 | Cookson | 101/40 X |
| 3,182,589 | 5/1965 | Green et al. | 101/40 |
| 3,249,044 | 5/1966 | Karlyn | 101/38 R |
| 3,276,356 | 10/1966 | Usko et al. | 101/40 |
| 3,503,329 | 3/1970 | Rossi | 101/40 |
| 3,521,298 | 7/1970 | Morel et al. | 101/40 |
| 3,521,554 | 7/1970 | Zurick | 101/40 |
| 3,613,571 | 10/1971 | Russell et al. | 101/40 |
| 3,783,777 | 1/1974 | Killen et al. | 101/40 |

*Primary Examiner*—Clifford D. Crowder
*Attorney, Agent, or Firm*—Bauer, Amer & King

[57] ABSTRACT

Apparatus for printing on the exterior surface of a generally round container such as a plastic or glass bottle or the like includes several stations that perform or cooperate to print the container. The stations are in line with each other and preferably are in line with both the production fabricating and the production filling lines of the container as well. There are four basic sections, the first of which is the loading section that successively receives and transports the individual containers towards a printing station. Before reaching the printing station, the containers may be flame-treated. After being imprinted, the containers, which up until this time are in horizontal condition pass through a first drying section and then are automatically rotated 90° to a vertical position prior to entering the production filling line. When necessary, a second drying station may be provided immediately downstream of the 90° turn mechanism and just prior to entering the filling production line. While moving through the flame-treating station, the printing station and at least the first drying station, the containers are continuously rotated about their own longitudinal axis. Actuation of a squeegee device in the printing station is prevented when no container is present.

24 Claims, 16 Drawing Figures

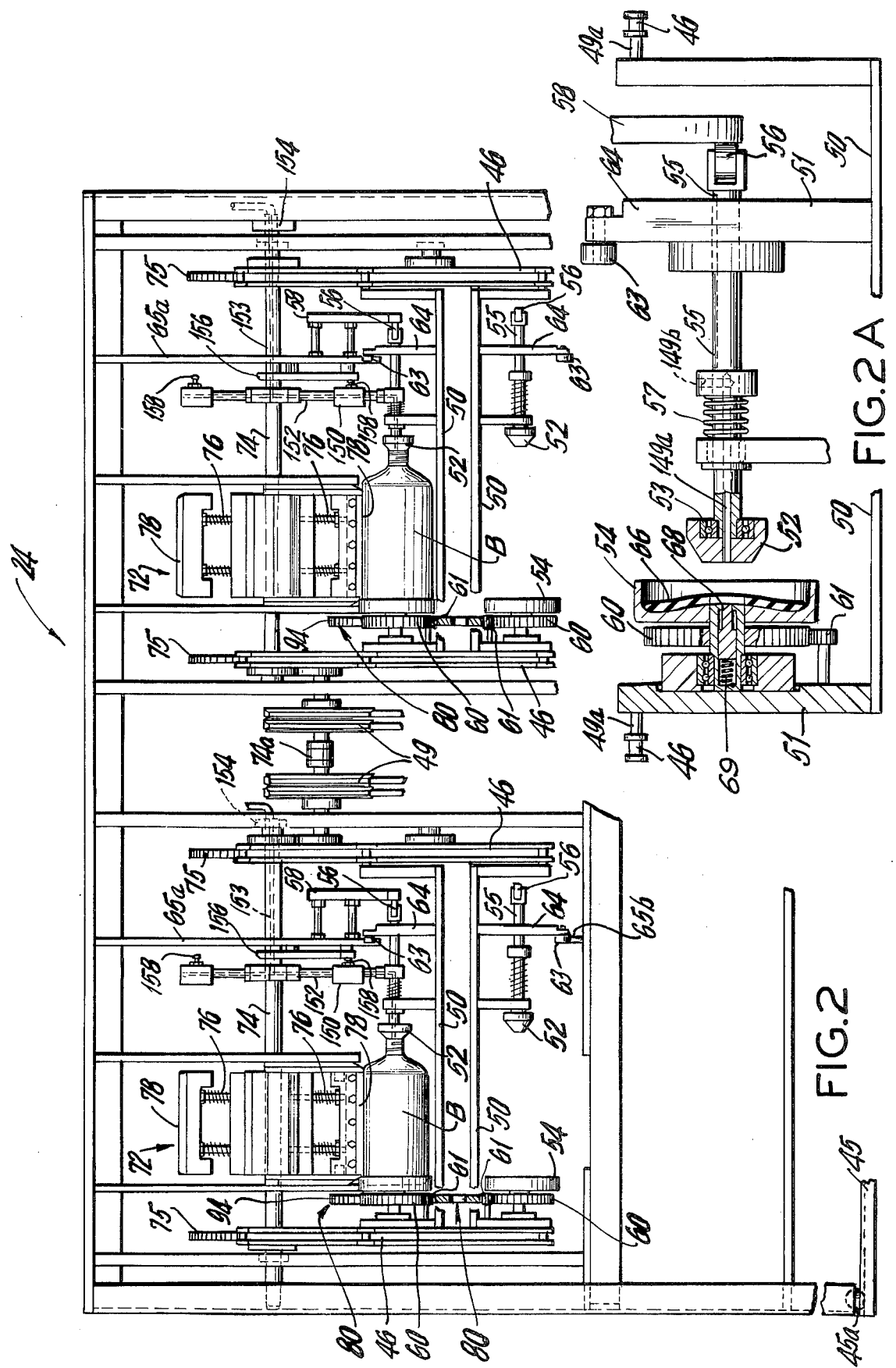

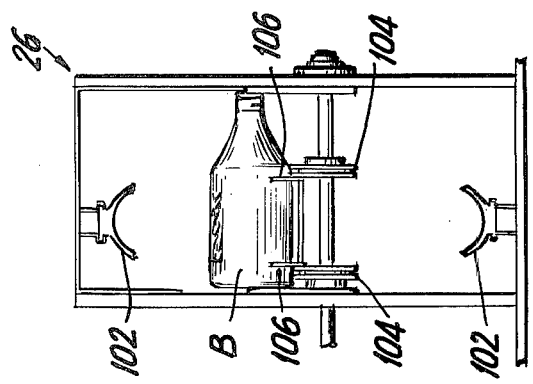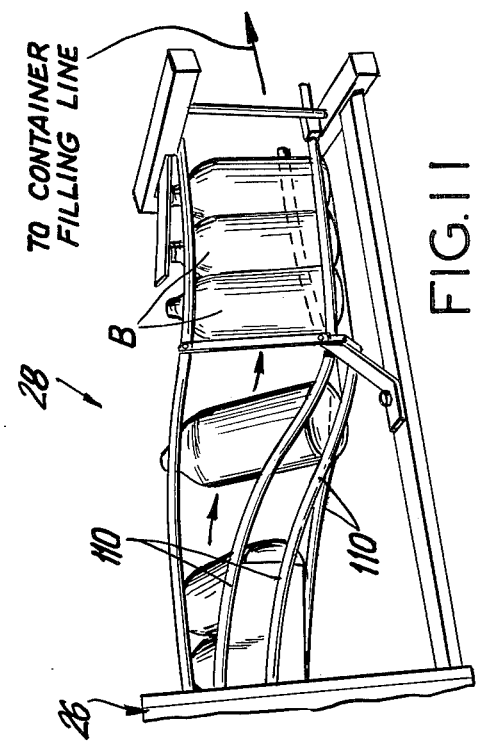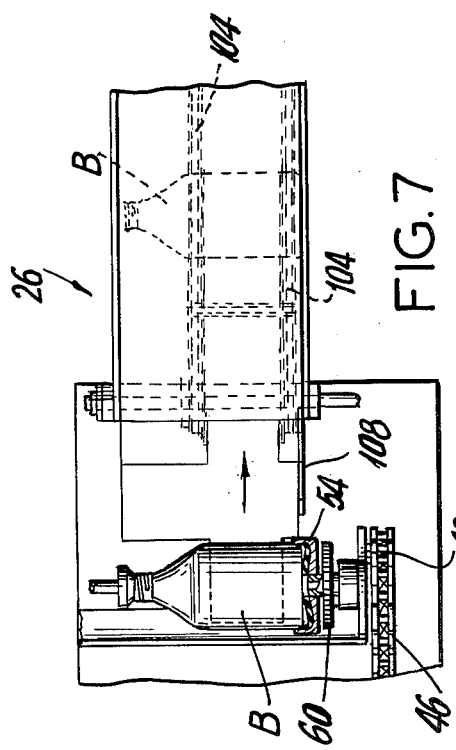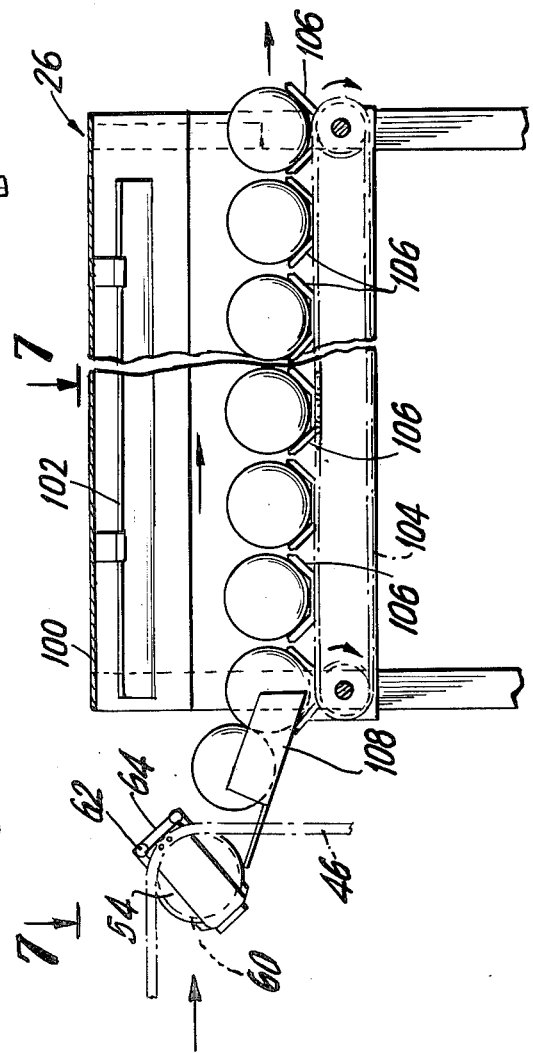
FIG.11
FIG.8
FIG.7
FIG.6

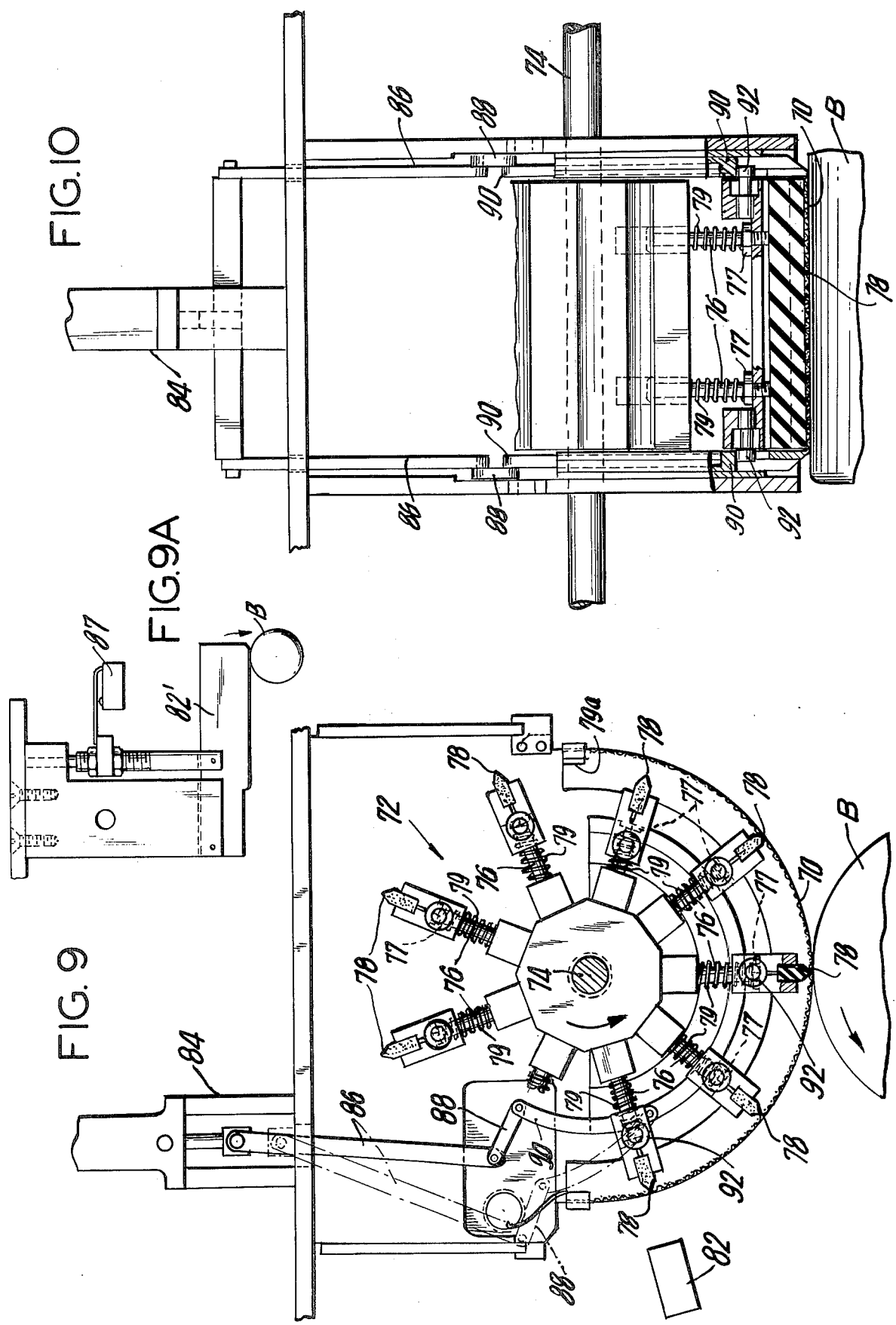

APPARATUS FOR SCREEN PRINTING BOTTLES

BACKGROUND OF THE INVENTION

1. Field of the Invention

This invention relates generally to high speed printing machines and more particularly to in-line printing apparatus for containers such as bottles or the like that are being successively moved along a predetermined path between a container production line and a container filling line.

2. Description of the Prior Art

The prior art printing apparatus generally employs intermittent motion in which the containers are first loaded, then moved step-wise, then stopped for the printing step and then linearly indexed away from the printing station. Prior art devices presently available are limited to a completion rate of about 60 to 80 containers a minute. Higher speeds have been claimed but have not been attained in practice. It will be readily apparent that the prior art mode of operation is excessively time consuming and therefore relatively costly. It will be equally apparent that an automated printing process that is integrated with both the container fabricating and the container filling production lines would be much more advantageous. The prior art devices, because of their "start-stop" mode of operation, interfere with the continuous running of the production line. More important, the limited speed of prior art printers prohibit an in-plant, in-line installation because most lines, especially for smaller size containers, fill at a rate of between 100 to 600 containers per minute.

As is well known in the industry, preprinted containers require average procurement lead time of from 6 to 8 weeks. Preprinted containers, of the type referred to, include plastic or glass bottles such as used by manufacturers of cosmetics, household items or foods or the like. Because of the wide variety of products that any particular manufacturer may be producing, it is necessary to have a large supply of containers of each size on hand at all times. For example, a manufacturer of cosmetics or household items may package from 10 to 15 items in identical containers in the usual sizes of ½ pint, 1 pint, 1 quart, etc. A full supply of each size container must be on hand covering at least the procurement lead time.

It will be appreciated that because of the wide variety of products that any one particular manufacturer may produce, it is necessary to have a large supply of containers of each size on hand at all times. For example, each item and each size container may be packaged under as many as 40 different distributor and private labels. The need for large inventories will become more apparent when it is realized that the quantities are based on projected sales schedules and that the actual sales may vary from these estimates. Further, when a specific item is ordered on a rush basis, it has, in the past, been necessary to wait until the containers were preprinted and, as mentioned above, this frequently takes 6 to 8 weeks.

SUMMARY OF THE INVENTION

The present invention provides an in-plant, in-line automatic and continuous container printer the advantage of which will be recognized when it is considered that many super markets sell a large percentage of merchandise under their own brand name and without preprinting of the containers. It is virtually impossible for any supplier to have a sufficiently large inventory of each brand name, in order to accommodate the sales requirements for each supermarket chain. The economics possible with an in-plant, in-line printer may be up to 75 percent of present costs for those products normally found in a supermarket, for example. This results in a substantial benefit to both the consumer and the manufacturer. By the use of an in-line printing station having a readily removable and changeable printing screen, preprinted containers are not necessary.

The fully automated operation of the present invention does not require a full time printer in attendance. Simplicity of operation of this invention permits regular line operators, whose main function is to lend a hand when automation misses occasionally and to make periodic adjustments, to also attend the improved bottle printer comprising this invention.

In its broadest aspect, the present invention provides a loading section for receiving successive individual containers, such as plastic or glass bottles or the like, and for moving them in a timed relationship through a flame-treating station, where necessary, and then towards and past a semicircular printing station having a plurality of squeegees that imprint the containers as they pass a stationary screen. Should a container be absent from the container transport mechanism, sensing means will detect the absence and prevent the squeegee from contacting the screen so that ink cannot be applied to the printing screen. The importance of the no container/no print feature of the present invention will become evident when it is realized that an empty station could cause excess ink supply through the screen thus causing smearing of the next 15 to 20 bottles until the excess ink has been used up. In a production line that runs for example, at the rate of 220 containers a minute, as many as 20 containers could have unsatisfactory printing without the no container/no print feature of the present invention.

The present invention provides container printing apparatus that is particularly useful in the economical printing of no deposit-no return round containers regardless of the size, or material of the container. The present invention provides production economies in that it is suitable for in plant-in production line installation and meets the production speed of the container filling lines that are presently in existence.

Container manufacturing equipment such as blow-molders are, by nature of their operation, slower than their associated filling line. However, it is practical to install several container molders whose combined capacity meets the filling line speed. In a container manufacturing plant, such as incorporated in a typical dairy filling line may utilize the improved printer of this invention to service as many as five blow molders, thus greatly reducing capital investment, space requirements and labor cost. Presently available prior art devices may require a printer for each molder. Moreover, in-plant molding requires in-plant printing.

Accordingly it is an object of the present invention to provide improved apparatus for automatically and continously printing the outer surface of a no deposit/no return container such as a plastic or a glass bottle.

It is another object of the present invention to provide apparatus, as described above, that may be used inline with existing container fabricating and filling installations.

A further object of the present invention is to provide printing apparatus, as described above, having synchronized means for transporting the containers therethrough.

Still another object of the present invention is to provide printing apparatus, as described above, including means for preventing the application of printing ink onto a screen when no container is present.

These and other objects, features and advantages of the invention will, in part, be pointed out with particularity, and will, in part, become obvious from the following more detailed description of the invention, taken in conjunction with the accompanying drawing, which forms an integral part thereof.

BRIEF DESCRIPTION OF THE DRAWING

In the various figures of the drawing, like reference characters designate like parts. In the drawing:

FIG. 2 is an end elevational view, taken along line 2—2 of FIG. 1 illustrating two side-by-side printing machines comprising the present invention;

FIG. 2A is a fragmentary elevational view, on an enlarged scale illustrating a component shown in FIG. 2;

FIG. 6 is a fragmentary side elevational view illustrating a first drying section of the present invention;

FIG. 7 is a fragmentary plan view taken along line 7—7 of FIG. 6;

FIG. 8 is an end elevational view of the structure shown in FIG. 6;

FIG. 9 is an enlarged fragmentary elevational view, partially in section, illustrating the printing section of the present invention;

FIG. 9A is a schematic end elevational view illustrating alternative sensor means;

FIG. 10 is a side elevational view of the structure shown in FIG. 9; and

FIG. 11 is a fragmentary elevational view of the unloading section of the present invention that may be positioned between the first and second drying sections.

DESCRIPTION OF THE PREFERRED EMBODIMENT

Figure 1:
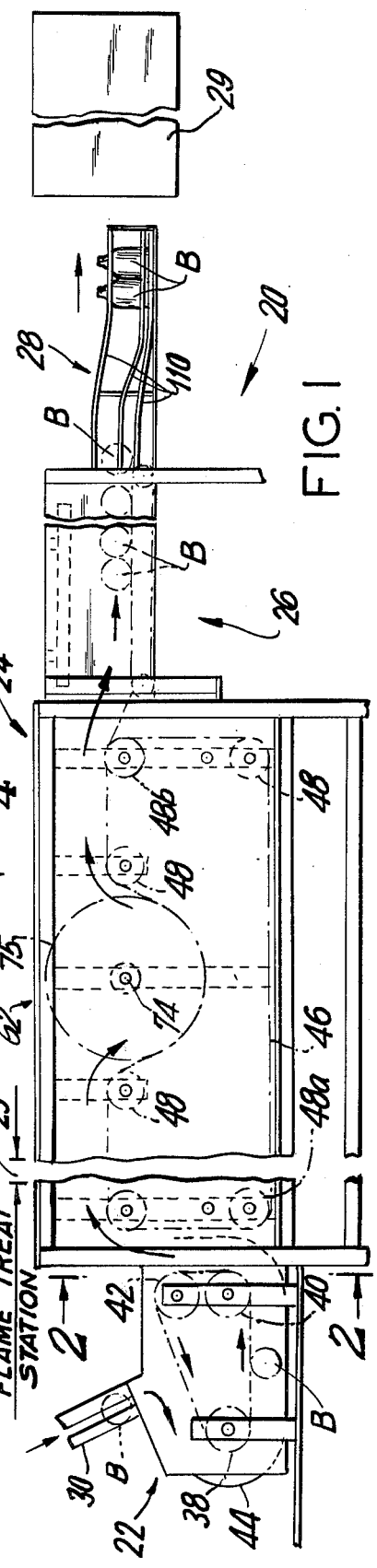
FIG. 1 is a schematic, fragmentary side elevational view illustrating one embodiment of the present invention.

Referring now to the drawing, and in particular to FIG. 1, there is shown the improved container decorating machine 20 comprising the present invention. The container decorating machine 20 is adapted to be placed immediately downstream of the container fabricating apparatus which is conventional and which is not shown. Similarly, the container decorating machine 20 is adapted to be placed immediately upstream of the container filling machine which is also conventional and which is not shown.

Basically, the container decorating machine 20 of this invention comprises four sections. The first section is a loading station 22. The second section is a printing station 24 which includes a flame treating station 25 having a safety valve, thermocouple and pilot light at the input end thereof. The flame treating station is particularly advantageous for the plastic containers to ensure that the subsequently applied ink will hold. The third section is the relatively short, first drying station 26 which is located immediately downstream of the printing station 24, and to the right thereof as shown in FIG. 1 for eliminating most of the volatile fumes which are exhausted outwardly by any suitable means. Finally, the fourth section is an unloading station 28 which is downstream of and to the right of the drying station 26, as shown in FIG. 1.

Where plastic containers are to be decorated, only a single drying station 26 is needed. Where glass bottles are to be decorated, a relatively longer, second drying station in the form of a heated tunnel 29 is required and is positioned immediately downstream of the unloading station 28 (FIG. 1). The second drying tunnel 29 may have to be longer and wider, for example 8 feet wide by 30 feet long, so as to contain as many as 2,000 bottles at the rate of 250 bottles per minute for eight minutes of drying and cooling. An elongated, serpentine path may be provided for the bottles in the second tunnel 29. This is necessary when the bottles are washed after printing and before filling. A special ink must be used for a caustic bath of 6 percent solution at 140° for 6 minutes. The ink must be cured sufficiently to withstand the washing without damaging the printing. By way of comparison, the first drying station 26 shown in FIG. 1 may be 5 feet long whereas the second drying tunnel 29 may be 30 feet long.

Figure 4:
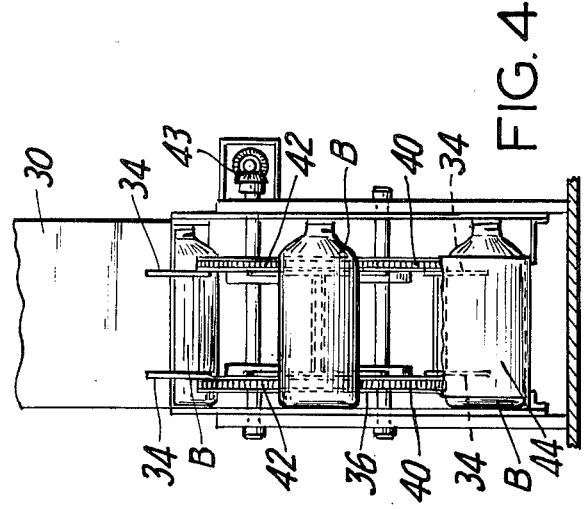
FIG. 4 is a transverse sectional view of the loading section taken along line 4—4 of FIG. 3.
Figure 3:
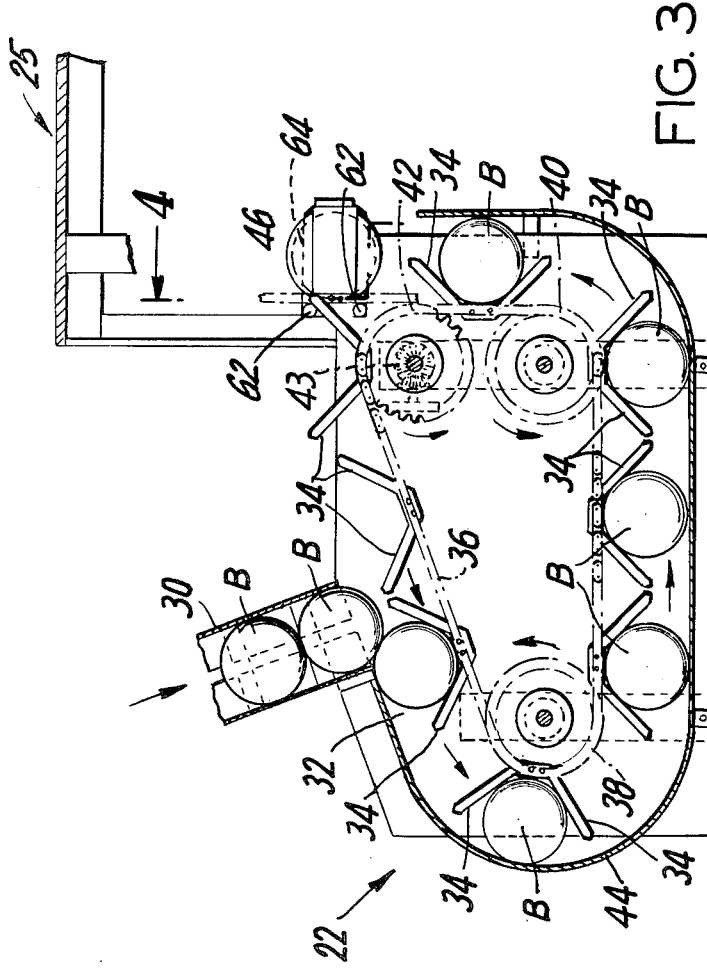
FIG. 3 is an enlarged, fragmentary elevational view illustrating the loading section comprising the present invention.

Turning now to the loading station 22, reference may be had to FIGS. 3 and 4 in particular. There is provided a chute 30 for delivering a stream of round bottles B to a conveyor that is generally designated by the reference character 32. The bottles B are individually fed to a plurality of pairs of laterally spaced apart U-shaped brackets 34 that are spacedly carried along on first endless belt means in the form of a pair of laterally spaced apart hollow pin chains 36 which will be described more fully hereafter. The brackets 34 are closely spaced so that a container cannot fall therebetween. A first plurality of roller means in the form of sprockets 38, 40 and 42 define a generally triangular and generally counterclockwise path for the chains 36. Drive means for the sprockets 38, 40 and 42 may be had by right angle bevel gear means 43 which are coupled to a drive motor (not shown). Immediately to the left of and below the chute 30 and in the direction of the counterclockwise travel of the chains 36, a housing 44, preferably with plastic guide rails to avoid scoring glass containers, is provided in order to retain the bottles B during their travel.

After being carried by the brackets 34 and the hollow pin chains 36, the bottles B travel into the printing station 24 (FIGS. 2 and 5) which is supported by track means 45 and roller means 45a so that the the entire section may be moved when different size containers are to be printed. Each side of FIG. 2 is set up for a particular size bottle. FIG. 2 is particularly suitable for a filling plant handling two sizes on a single common line. All line equipment is changed over to accommodate a specific size. The change over of the printer neccessitates loosening only four bolts, connecting the 90° turn shown in FIG. 1 to the main drying tunnel or regular conveyer line, moving the required size side in line with the main line and refastening the bolts. A clutch engages the side needed. The unit just described will have two loading stations 22 (FIG. 3), two first drying stations (FIG. 1) and two 90° turn stations 28 (FIG. 1). Bottle manufacturers often have small runs of many different sizes that require a single row model and a set of bottom ware holders for each size bottle. Limitation of size variation of the bottles is 2 inches in length and 1 inch in diameter. To accommodate different size bottles adjustments are made by a cam rail and adjusting blocks for correct screen contact adjustment. Where only one size is run, the adjusting blocks are still necessary to insure hair line contact with the printing screen.

Figures 5, 5A:
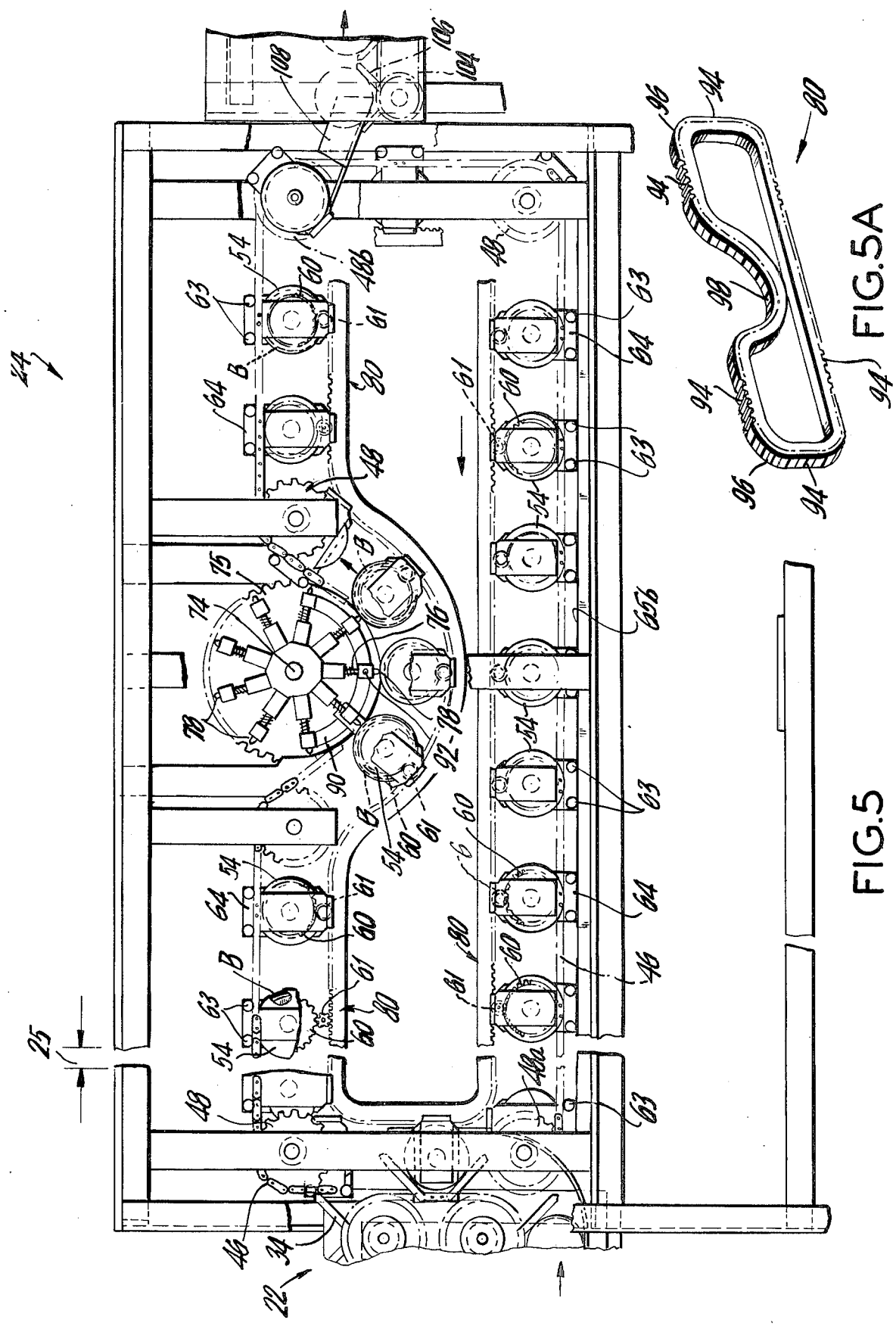
FIG. 5 is an enlarged side elevational view of the combined flame treating and printing sections comprising the present invention.
FIG. 5A is a perspective view of an oblong rack used in the printing sections shown in FIG. 3 and FIG. 5.

Second endless belt means in the form of a pair of laterally spaced apart, endless hollow pin chains 46 are trained about second roller means which are in the form of a plurality of sprockets 48 that travel along a generally rectangular and generally clockwise path as shown in FIGS. 1 and 5. Sprocket 48b is a driving member that tends to pull, not push, the chain 46. The sprocket 48b is driven by a belt and pulley system 49 and a motor (not shown). Referring now to FIG. 2 and to FIG. 2A, it will be seen that the two hollow pin chains 46 are connected to each other by means of pins 49a that are coupled to a plurality of transverse connecting tie bars 50 and flight brackets 51 on each of which is mounted a rotatable nose cone 52 and a spaced apart bottom ware holder in the form of a cup-shaped base member 54. The nose cone 52 and the base member 54 are arranged to releasibly engage the mouth and the base, respectively, of the bottles B. As the bottles B approach the sprocket 40 in the loading station 22, for example adjacent the sprocket designated 48a in FIGS. 1 and 5, they pass between one nose cone 52, for example made of Teflon or stainless steel, and its associated cup-shaped base member 54, at which time the nose cone 52 is biased to the left as shown in FIG. 2. A non-rotatable, linear bushing supported, spring biased shaft 55 on which the nose cone 52 is mounted assures smooth operation even for glass bottles whose height dimension may vary as much as ±⅛ inch. At its opposite end, the shaft 55 is provided with a first cam follower 56 that is arranged to engage a fixed but adjustably positionable cam rail 58 so that the nose cone 52 will be urged to the left as shown in FIG. 2A. In this manner the tapered nose cone 52 enters the open end of the bottle B and thereby seats the bottles B in the cup 54. A variation of the standard nose cone 52 will be discussed later.

An enlarged detail of the standard bottle holder nose cone 52 and cup-shaped base member 54 is shown in FIG. 2A. The nose cone 52, which is made of Teflon, glass, stainless steel or plastic, is rotatably journalled by ball bearings 53 and is biased (FIG. 2A) by a compression spring 57. It will also be seen that integral with each cup-shaped base member 54, there is provided a spur gear 60 and a mating pinion 61 whose function will be described more fully hereinafter. In addition, there is also provided a second pair of second cam followers 63 that are supported on an arm 64 and which cooperate with first and second rigid bars 65a and 65b in the printing station 24 so as to provide a steadying effect on the bottle B as it passes through the printing station. The bars 65a follow a semicircular path around the printing screen which will be described subsequently and the cam followers 63 are secured in a groove so as to provide the steadying effect. The bars 65b, on the return path, serve to prevent chain whip under high speed and will prevent vibration from being set up. A resilient pressure pad 66 is formed in the cup-shaped base member 54 as is an ejector pin 68 that is axially biased by a spring 69 as shown in FIG. 2A. The bottle B is thus transported to the flame treating station 25 by the nose cone 52 and the cup-shaped base member 54 and then through the printing station 24 shown in FIG. 5 and in greater detail in FIGS. 9 and 10.

The standard nose cone assembly 52 may be varied by replacing the ball bearing 53 with a needle bearing and by placing the compression spring 57 intermediate the transverse base wall of the nose cone 51 and a shoulder formed on the shaft 55.

The printing station 24 is comprised of a fixed, arcuate screen means 70 that has the desired design formed thereon in a conventional manner. The bottles B pass the screen means 70 in tangential contact therewith. A rotating squeegee assembly, generally designated by the reference character 72 is mounted on a transverse shaft 74 to which is secured additional roller means in the form of an idler sprocket 75 (FIGS. 2 and 5) and includes a plurality of axially displaceable radially extending arms 76 each of which includes a squeegee 78 at the radially outer end thereof. Lock nuts 77 hold the arms in place but when the lock nuts 77 are loosened the arms can be moved radially for adjustment purposes. The ink is forced through the screen means 70 onto the surface of the bottles B by means of the rotating squeegees 78 which may be made of a plastic material or a 40 durometer butyl rubber. Coupling means 74a (FIG. 2) join the shaft which supports the sprockets 48b of two side-by-side container printing machines 20 so that containers of different sizes may be printed simultaneously on one common production line. The bottle and lateral surface of the screen means 70 are synchronized while bottle B travels through the printing station. Any change of speed will affect each component proportionately and will maintain precision alignment at any speed.

Concurrently the pinion 61 engages a fixedly positioned rack 80 shown schematically in FIG. 5A. The teeth of rack 80 define an outline that is congruent with the path of hollow pin chains 46 so that bottles are rotated as they are advanced. In actual practice the rack 80 is in the form of a continuous path from point 202b, and clockwise to point 202a. Between points 202b and 202a spur gears 60 engage a half gear 200 to continue counter-clockwise rotation of bottle B. Points 202a and 202b overlap the half gear 200 for several of its teeth so that smooth transfer can be had.

The no container/no print feature of the present invention is shown best in FIGS. 9 and 10. When a bottle is missing for any reason, a signal from an appropriate sensor, for example a photo electric cell 82 shown schematically in FIG. 9, actuates an air cylinder 84 and thereby moves a connecting bar 86 from the position shown in solid outline to the position shown in dotted outline in FIG. 9. The photocell 82 is applicable to substantially opaque containers. Alternatively a mechanical arrangement could be used such as a pivotally mounted flat feeler 82' that is wider than the center distance between adjacent bottle holders. An empty station will cause the feeler 82' to drop and thereby actuate a switch 87 as shown in FIG. 9A. A link 88 is connected to an arcuate, flexible cam rail 90 which is moved between the solid and dotted outline shown in FIG. 9 when the air cylinder 84 is actuated. When a bottle is present, two rollers 92, one on each side, that are integral with each of the arms 76 will ride on the radially outer surface of the cam rail 90. However, when a bottle is absent, the radially inner surface of the deflected cam rail 90 will engage the rollers 92 to thereby prevent the squeegee 78 from contacting the inside surface of the screen means 70 and in this manner will prevent ink from being deposited and remaining on the screen in the absence of a bottle B. A spring 79 normally maintains the arms 76 in their radially outer positions so that the rollers 92 engage the outer surface of the cam rail 90 when a bottle is present. Spring 79 also maintains contact pressure with the screen means 70.

Figure 5B:
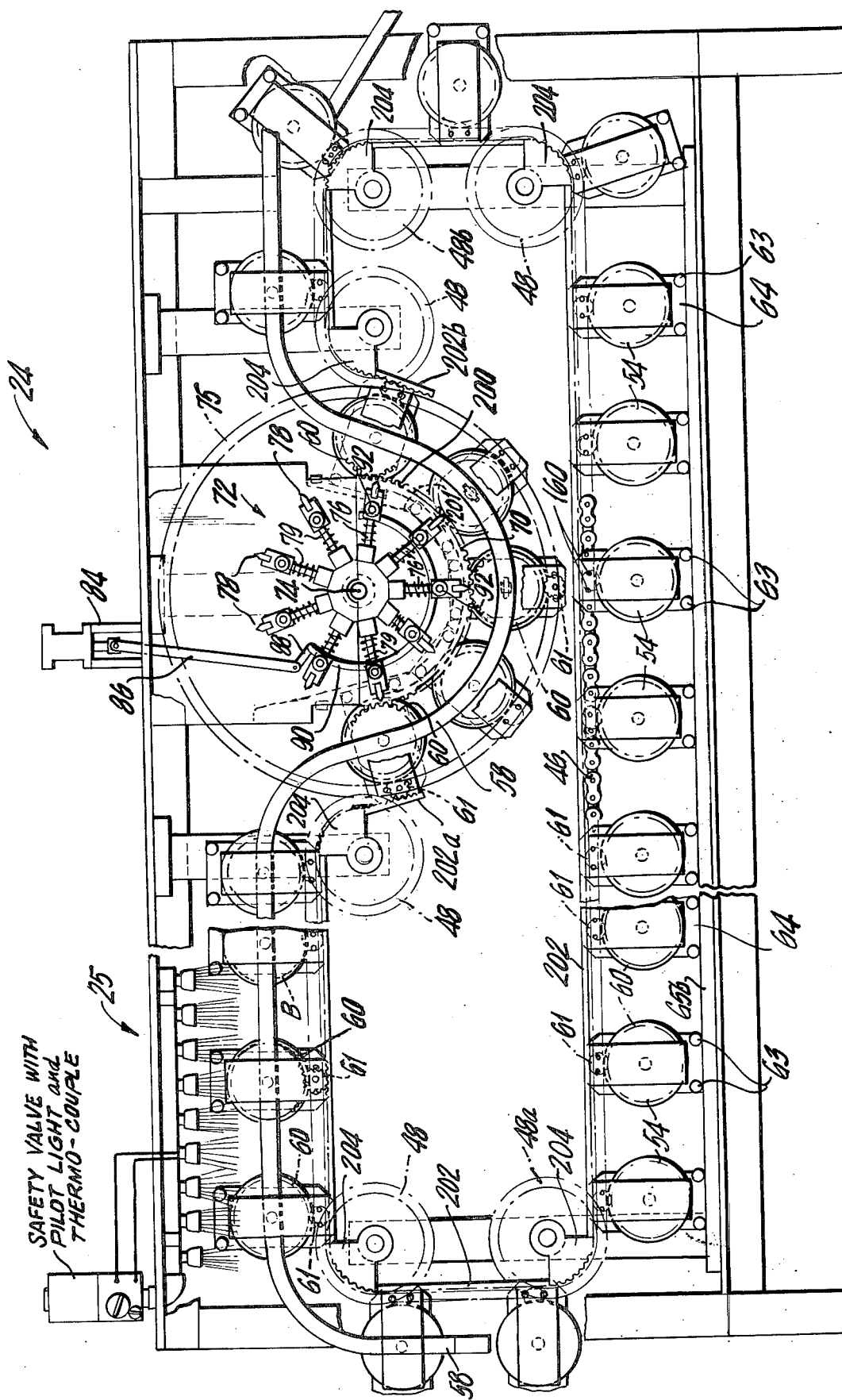
FIG. 5B fragmentarily and schematically illustrates an alternative oblong rack assembly together with the cam rail and idler gears associated therewith.

When traveling at the printing station 24, as shown in FIG. 5B the spur gears 60 that are integral with the cup-shaped base members 54 engage the half gear 200. In this manner positive bottle rotation is provided as the bottles B traverse the stationary screen 70. The alternative oblong rack 80 is made up of a plurality of linear sections 94 interconnected by arcuate corner segments 96 and an arcuate, central section 98. Rack 80, without the arcuate central section 98, together with half gear 200 form an endless path. Hollow pin chains 46 move in a clockwise direction while the rack 80 and the half gear 200 are stationary. Pinion 61 engages the rack 80 and the spur gear 60 engages the half gear 200 to ensure counter-clockwise rotation of the bottles B. Also, rotation of the bottles B throughout the entire forward and empty return path ensures smooth and vibration-free operation as opposed to a gear and rack engagement at the beginning of the working cycle with consequent jarring and abnormal gear wear.

Preferably there are three times the number of container holding stations (each station being defined by a nose cone 52 and a cup-shaped base member 54) as there are squeegees 78. Only three container holding stations need by synchronized with each squeegee 78. There may, for example, be eight, nine or ten squeegees 78 and the idler sprocket 75 may have a pitch diameter of 12 to 28 inches which pitch diameter is determined by a multiple of center distances between the bottles B and the number of squeegees 78. Sprocket 75 must have a number of teeth that are a multiple of the center distance of tie bars 50. That multiple determines the number of squeegees 78. This may allow more than one bottle in the print station at one time. Locating sensor 82 or 87 as shown in FIGS. 9 and 9a, respectively, insures that only empty stations will retract a squeegee 78. This is necessary in order to allow the printing speed to coincide with the speed of the filling container so that the present invention performs its function automatically when integrated with the conventional conveyor line between the container supply and filling stations. The positive and mechanical rotation of the individual bottles B prevents even the slightest slipping between the screen means 70 and the container B to thereby avoid smearing ink on a container B. This also prevents smearing of ink on the screen means 70 which, should it occur, would cause the next several bottles B to be improperly imprinted because of an excess of ink.

From the printing station 24, the bottles B enter the drying station 26 which is shown in FIGS. 6, 7, and 8. The drying station 26 is defined by a housing 100 that is open at both ends. Infra-red heating means 102 are mounted within the housing 100. Quartz heaters are preferred for plastic containers since they heat and cool almost instantaneously in contrast to metal elements which take a long time to heat up and cool off. Thus there is little chance of burning a plastic container should there be a line stoppage when there are containers in the drying station 26. If desired, the infra-red heating means 102 may be positioned both above and below the path of the bottles B as shown in FIGS. 6 and 8. Two heaters 102 are particularly advantageous when the art work covers more than 180° of the circumference of the container. There is also provided a hollow pin endless chain 104 having a plurality of pairs of generally U-shaped brackets 106 secured thereto. The bottles B are not rotated in the drying station 26. After the nose cone 52 is retracted and the ejector pin 68, which is urged by the spring 69, axially displaces a bottle B approximately at the position of the sprocket designated by the reference character 48b in FIGS. 1 and 5, the bottle B is deposited on a connecting ramp 108 and then onto a bracket 106 and is thereby carried through the drying station 26.

After leaving the drying station 26, the bottles B are received in a plurality of laterally spaced apart rods 110 having arcuate portions that gently turn the bottles B from the horizontal position in which they are mounted in the loading, printing and drying sections 22, 24 and 26, respectively, to a vertical position so that the printed bottles B may be delivered to the filling machinery that is downstream thereof. Where plastic bottles are printed, only a single drying station is required. Where glass bottles are printed, the second drying 29 station, downstream of the rods 110 receive the bottles B for further heating.

Special problems are encountered where plastic containers are to be decorated. More particularly, the surface of the container should be rigidized so that they do not buckle when the squeegees are applied thereto. The present invention provides means for at least temporarily inflating the plastic containers.

As shown best in FIGS. 2 and 2A, each nose cone support shaft 55 is hollow and is in fluid communication via passageways 149a and 149b with its respective inflation assembly each of which is comprised of a first valve 150 such as a Schrader valve (part number 7796SP5). Conduit means 152 fluidly couple the valve 150, through a passageway 153 and a common rotary swivel joint 154, that is, in turn, fluidly coupled to a remote source of pressurized air (not shown). A fixed cam 156 is arranged so as to be engaged by a contact 158 on each valve 150 that is associated with each nose cone support shaft 55. When the bottles B are in the printing station 24 adjacent the screen means 70, the bottles B will be inflated or charged with air at the time when the squeegees 78 press against the screen means 70. The air pressure admitted to bottles B in the printing station 24 is regulated and has a constant flow throughout the printing cycle. This is necessary because blow molded bottles are trimmed of flash after molding and this often causes an imperfect neck seat that causes leakage, thus nullifying the principle of one shot air held by means of a check valve.

Figure 2B:
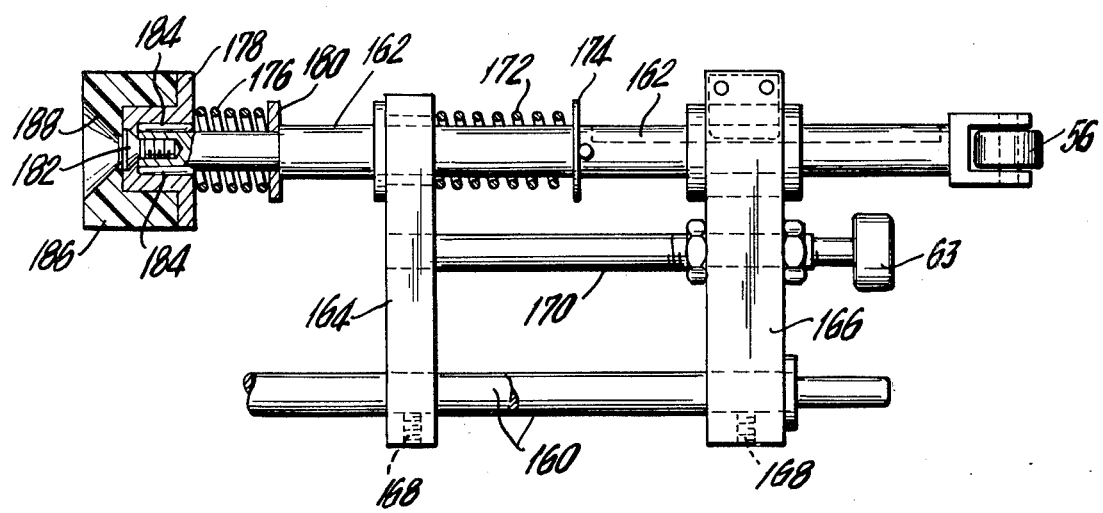
FIG. 2B is a fragmentary elevational view illustrating an alternative construction for the component shown in FIG. 2A with certain components omitted for clarity.

Turning now to FIG. 2B there is shown an alternative embodiment for supporting and transporting the bottles B through the printing station 24. Each tie bar 50 is replaced by a pair of flight pins 160 which are suitably secured to the chains 46 by inserting flight pins 160 into the holes on the pitch line of the hollow pin 160 chains. A first shaft 162 is secured to each flight pin by means of brackets 164 and 166 together with flat head screws 168.

A stud 170 threaded at each end positions the brackets 164 and 166 to a desired center distance. Moreover the stud 170 holds brackets 164 and 166 rigid in a vertical position. A pair of cam rollers 63 mounted on the studs 170 engage the print guide rail 65a to rigidize the assembly so as to prevent even the slightest rocking or dipping action of the hollow pin chains 46 which would alter the necessary hairline contact of the bottle B and the screen means 70. The construction shown in FIG. 2B compensates for length variations of glass bottles which may be as much as ±⅛ inch, is less expensive than the construction shown in FIG. 2a and is used where space is not critical.

The roller 56 is secured to one end of the first shaft 162 which is comparable to the shaft 55 in the embodiment of FIG. 2B. A first compression spring 172 extends between the bracket 164 and a first stop 174. A second compression spring 176 extends between a nose cone support 178 and a second stop 180. Screw 182 secures the support 178 to the first shaft 162 such that a needle bearing 184 may be positioned therebetween. Nose cone 186 is secured to the support 178 in any suitable manner, such as by adhesives, and is provided with a conical bore 188 that is arranged to receive a relatively small bottle with a relatively small open end such as is used for hair tonic or for a closed container having no open end. The spring 176 serves the purpose of compensating for length variations (±⅛ inch) of glass bottles.

Referring now to FIG. 5B there is shown an alternative construction for the rack 80. In this embodiment the arcuate section 98 of the oblong rack 80 is replaced by a stationary half gear 200. The cam rail 58 which has not previously been shown in side elevation is the same as in the previous embodiment. Preferably, the flight pins 160 for supporting the nose cone 52 and the cup-shaped member 54 are used in this embodiment.

Normally the pinions 61 engage the straight rack sections 202 and the arcuate corner sections 204. At the end of straight rack section 202a the pinions 61 disengage and the spur gears 60 engage the half gear 200. The pinions 61 engage the end of rack section 202b when the gears 60 disengage from the half gear 200. Rotation of the bottles B will be continuously counter-clockwise. Rotation of the bottles B, even through the return path (to the left in FIG. 5B) eliminates having to start rotation of the pinions 61 at high speed at the pick up station which would cause excessive gear wear and jarring of the line that would impair printing quality.

It should be particularly noted that the rack sections 202a and 202b are synchronized with the stationary half gear 200 and overlap by two to three teeth. The half-round screen 70 and the half-gear 200 eliminate any critical geometry.

There has been disclosed heretofore the best embodiment of the invention presently contemplated. However, it is to be understood that various changes and modifications may be made thereto without departing from the spirit of the invention.

What I claim as new and desire to secure by Letters Patent is:

1. An in-line automatic and continuous container printer adapted to be positioned colinearly with and intermediate container production and container filling lines, said printer comprising:
   a. a loading station including a first plurality of roller means, first endless belt means trained about said first roller means and first means for driving one of said first roller means for receiving and transporting a plurality of successive containers;
   b. a printing station including a second plurality of roller means, a second pair of laterally spaced apart endless belt means trained thereabout and means for driving at least one of said second roller means for receiving successive containers from said loading station, said printing station further including stationary, arcuate screen means having an outer surface past which the containers are transported in tangential contact, a plurality of squeegees normally in tangential contact with the inner surface of said screen means for driving such squeegees over the inner surface of said screen means whereby a supply of ink passes through said screen means, said second roller means being positioned such that said second belt means are moved along a generally rectangular path, one of the longer legs of said rectangular path including an arcuate path portion, there being further included a shaft and additional roller means mounted on said shaft for maintaining the shape of said arcuate path portion, said arcuate screen means being coaxial with said arcuate path portion of said second belt means, there being still further included a plurality of arms extending radially from said shaft, one of said squeegees being mounted on the radially outer end of each said arm, said second means for receiving the successive containers comprising a plurality of pairs of nose cone assemblies and cup-shaped base member assemblies, each said nose cone assembly in said pair being coupled to one of said second belt means in said printing station, each said base assembly in said pair being secured to another one of said second belt means in said printing station and means for urging said nose cone assemblies toward said base member assemblies and into the open end of the containers;
   c. means for rotating the containers about their own longitudinal axes during transport thereof past said screen means, said means for rotating the containers comprising a gear coaxial and integral with each said base member assembly and a cooperating, generally oblong rack that is at least partially congruent and coaxial with said second belt means in said printing station;
   d. means for detecting the absence of a container in said printing station, said detecting means being positioned adjacent said screen means for preventing contact between selected ones of said squeegees and said screen means; and
   e. a drying station for receiving the containers after the printing thereof.

2. The printer according to claim 1 wherein there is further included a plurality of generally U shaped brackets carried by said first endless belt means for receiving and transporting the containers in and through said loading station.

3. The printer according to claim 1 wherein said first roller means are sprockets and said first belt means are a pair of laterally spaced apart chains in engagement with said sprockets.

4. The printer according to claim 1 wherein said first roller means are positioned such that said first belt means are moved along generally triangular paths that are parallel to each other.

5. The printer according to claim 1 wherein said second roller means are sprockets and said second belt means are chains in engagement with said sprockets.

6. The printer according to claim 1 wherein said additional roller means comprises a pair of coaxial sprockets.

7. The printer according to claim 6 wherein each said arm includes a roller thereon and said means for detecting the absence of container and for preventing contact of said associated squeegees with said screen comprises sensing means for generating a signal in the absence of a container, cylinder means having an arm that is movable in response to said signal, and a cam coupled to said arm, said cam having first and second surfaces whereby, in the absence of a container and in response to a signal indicating said absence, said cam is displaced whereby said rollers engage said second cam surface to thereby displace said squeegee in a direction away from said screen, said rollers normally engaging said first cam surface when a container is present in said printing station and in opposition to said associated squeegee.

8. The container according to claim 1 wherein there is further included means for adjustably biasing said squeegees in a radial direction towards said screen.

9. The printer according to claim 1 wherein each said cup-shaped base member assembly includes means for ejecting the container therein after printing.

10. The printer according to claim 1 wherein each said cup-shaped base member assembly includes a resilient pad.

11. The printer according to claim 1 wherein there is further included a fixed cam and each said hose cone assembly includes a first cam follower for engaging said fixed cam whereby said nose cone assembly is urged into the open end of the container.

12. The printer according to claim 1 where there is further included a rigid bar and each said nose cone assembly includes a roller for engaging said bar whereby the containers are steadied during printing thereon.

13. The printer according to claim 1 wherein each said nose cone assembly is hollow and wherein there is further included means for introducing pressurized air into said nose cone assemblies to thereby inflate the containers in said printing station.

14. The printer according to claim 13 wherein said means for introducing pressurized air comprises valve means in fluid communication with the interior of each said nose cone assembly and with the source of pressurized air, valve actuating means integral with each said valve means, a fixed cam adapted to be engaged by successive ones of said valve actuators whereby said valve means are successively opened and air is introduced into the containers when the containers are in said printer station.

15. The printer according to claim 1 wherein there is further included means intermediate said loading station and said printing station for pre-heating the containers.

16. The printer according to claim 1 wherein there is further a flame trating station intermediate said loading station and said printing station.

17. The printer according to claim 1 wherein said drying station includes a housing that is open at two opposed ends thereof, endless conveyor means in said housing, means integral with said conveyor means for receiving the containers from said printing station, drive means for said conveyor means whereby the containers are moved between said opposed housing ends and at least one heating means positioned above the path of the containers within said housing.

18. The printer according to claim 17 wherein said first heating means are quartz heaters.

19. The printer according to claim 17 wherein there are two heating means positioned above and below the path of the containers.

20. The printer according to claim 19 wherein said first and said second heating means are quartz heaters.

21. The printer according to claim 1 wherein the containers are in a horizontal position in said loading station, said printing station and said drying station, there being further included erecting means downstream of said drying station for turning the containers to a vertical position.

22. The printer according to claim 21 wherein said erecting means comprises a plurality of laterally spaced apart, curved rod for receiving the containers.

23. The printer according to claim 21 wherein there is further included second drying means downstream of said erecting means.

24. The printer according to claim 1 wherein there are two side-by-side loading stations, printing stations, means for rotating the containers about their own longitudinal axes, means for detecting the absence of a container and for preventing contact between said associated squeegee and said screen and said drying station, there being further included means for coupling said side-by-side printing stations.

* * * * *

UNITED STATES PATENT OFFICE
CERTIFICATE OF CORRECTION

PATENT NO. : 3,933,091
DATED : January 20, 1976
INVENTOR(S) : Henry Carl Von Saspe It is certified that error appears in the above-identified patent and that said Letters Patent are hereby corrected as shown below:

IN THE CLAIMS:

Claim 11, line 2, change "hose" to --nose--

Claim 12, line 1, change "where" to --wherein--

Signed and Sealed this eighteenth Day of May 1976

[SEAL]

Attest:

RUTH C. MASON
Attesting Officer

C. MARSHALL DANN
Commissioner of Patents and Trademarks